United States Patent [19]
Kawada

[11] Patent Number: 5,499,706
[45] Date of Patent: Mar. 19, 1996

[54] VISCOUS FLUID CLUTCH WITH AUXILIARY RESERVOIR

[75] Inventor: Shinichi Kawada, Atsugi, Japan

[73] Assignee: Unisia Jecs Corporation, Atsugi, Japan

[21] Appl. No.: 366,767

[22] Filed: Dec. 30, 1994

[51] Int. Cl.⁶ .................................................... F16D 35/02
[52] U.S. Cl. ...................................... 192/58.4; 192/82 T
[58] Field of Search .................................. 192/58 B, 82 T

[56] References Cited

U.S. PATENT DOCUMENTS

| | | | |
|---|---|---|---|
| 4,355,709 | 10/1982 | Light | 192/58 B |
| 4,909,367 | 3/1990 | Elmer | 192/58 B |
| 4,940,121 | 7/1990 | Digele | 192/58 B |
| 4,974,713 | 12/1990 | Maus et al. | 192/58 B |

FOREIGN PATENT DOCUMENTS

| | | |
|---|---|---|
| 61-109922 | 5/1986 | Japan . |
| 62-124330 | 6/1987 | Japan . |
| 62-196428 | 8/1987 | Japan . |
| 3-26839 | 3/1991 | Japan . |
| 5-47866 | 12/1993 | Japan . |

*Primary Examiner*—Andrea L. Pitts
*Attorney, Agent, or Firm*—Foley & Lardner

[57] ABSTRACT

A viscous fluid clutch includes a housing rotatably mounted to a drive shaft and a clutch plate attached to the drive shaft. These relatively rotatable members have a fluid shear space therebetween and cooperable with a fluid medium in the shear space to provide a shear-type fluid drive therebetween. The housing includes a reservoir, an operating chamber and a pump outlet opening communicating between the operating chamber and the reservoir. An annular wall is secured at its inner and outer peripheral edges to the clutch plate and includes an annular bend between the outer and inner peripheral edges to define an annular auxiliary reservoir in cooperation with the clutch plate. The housing has an annular recess accommodating the annular bend. The annular recess is defined by a conical surface increasing its radial distance from the axis of rotation of the drive shaft. This conical surface and the opposed surface of the annular bend define therebetween an annular passage communicating with the operating chamber. The annular bend is formed with radial openings adjacent the operating chamber. With this arrangement, during rotation of the drive shaft, the fluid medium thrown outwardly from the auxiliary reservoir, owing to the centrifugal force, through the radial opening into the annular passage will flow along the conical surface into the operating chamber.

7 Claims, 2 Drawing Sheets

VISCOUS FLUID CLUTCH WITH AUXILIARY RESERVOIR

BACKGROUND OF THE INVENTION

The present invention relates to a viscous fluid clutch adapted to drive an accessory device, such as a cooling fan, for an internal combustion engine.

Japanese Utility Model Application First Publication No. 3-26839 discloses a viscous fluid clutch adapted to drive a cooling fan for an internal combustion engine. This viscous fluid clutch includes relatively rotatable first and second drive members having a fluid shear space therebetween and which are cooperable with a fluid medium in the shear space to provide a shear-type fluid drive therebetween. In the viscous fluid clutch, an auxiliary reservoir is provided in addition to a main reservoir for storing fluid in order to decrease the level of fluid at rest and to avoid dragging of the first drive member upon starting to rotate the second drive member at cold engine.

Specifically, a housing is rotatably mounted to a drive shaft and a clutch plate is attached to the drive shaft. The housing includes a reservoir, an operating chamber and a pump outlet opening communicating between the operating chamber and the reservoir. The clutch plate includes an annular projection defining an annular space serving as the auxiliary reservoir. The housing has an annular recess accommodating the annular projection. The annular recess is defined by a cylindrical surface extending around the axis of rotation of the clutch plate. The annular projection of the clutch plate is formed with radial openings. During rotation of the clutch plate upon start at cold engine, the fluid medium is thrown radially outwardly from the auxiliary reservoir, owing to the centrifugal force, through the radial openings. In order to pump the fluid medium axially toward the operating chamber and then to the pump outlet opening, the annular projection has pump elements opposed to the cylindrical surface of the housing. Owing to this pump structure, there occurs transmission of drive to the housing. Besides, high precision machining is required, resulting in cost increase in manufacturing.

An object of the present invention is to improve a viscous fluid clutch of this type such that, without the pump, the fluid medium within the auxiliary reservoir flows quickly into the operating chamber with inducing the dragging phenomena.

SUMMARY OF THE INVENTION

According to one aspect of the invention, there is provided a viscous fluid clutch, comprising:

first and second relatively rotatable drive means, said first drive means having an operating chamber and a reservoir;

fluid shear drive means on said first and second drive means located in said operating chamber operable with a fluid medium to provide a shear-type fluid drive between said first and second drive means;

said first drive means having a pump outlet opening communicating between said operating chamber and said reservoir, said second drive means having wall means defining an auxiliary reservoir, said first drive means and said auxiliary reservoir defining wall means having opposed spaced surfaces defining therebetween a passage communicating with said operating chamber;

radial opening means for providing communication between said auxiliary reservoir and said passage, said passage defining surface of said first drive means progressively increasing its radial distance from the axis of rotation of said first drive means such that, during rotation of said first drive means, the fluid medium thrown outwardly from said auxiliary reservoir, owing to the centrifugal force, through said radial opening means into said passage will flow along said passage defining surface of said first drive means into said operating chamber; and pump means means for pumping the fluid medium from said operating chamber out of said pump outlet opening.

According to a specific aspect of the invention, there is provided a viscous fluid clutch, comprising:

a drive shaft;

a housing rotatably mounted to said drive shaft, said housing including a reservoir, an operating chamber and a pump outlet opening communicating between said operating chamber and said reservoir;

a clutch plate attached to said drive shaft and disposed in said operating chamber;

fluid shear drive means on said housing and said clutch plate located in said operating chamber operable with a fluid medium to provide a shear-type fluid drive between said housing and said clutch plate;

an annular wall secured at inner and outer peripheral edges thereof to said clutch plate and including an annular bend between said outer and inner peripheral edges thereof to define an annular auxiliary reservoir in cooperation with said clutch plate;

said housing having an annular recess accommodating said annular bend and including a conical surface defining an outer portion of said annular recess, said conical surface increasing its radial distance from the axis of rotation of said clutch plate, said conical surface and the opposed surface of said annular bend defining therebetween an annular passage communicating with said operating chamber;

radial opening means formed in said annular bend adjacent said operating chamber, the arrangement being such that, during rotation of said drive shaft and said clutch disc, the fluid medium thrown outwardly from the auxiliary reservoir, owing to the centrifugal force, through said radial opening means into said annular passage will flow along said conical surface into said operating chamber.

DETAILED DESCRIPTION OF THE INVENTION

Figure 1:
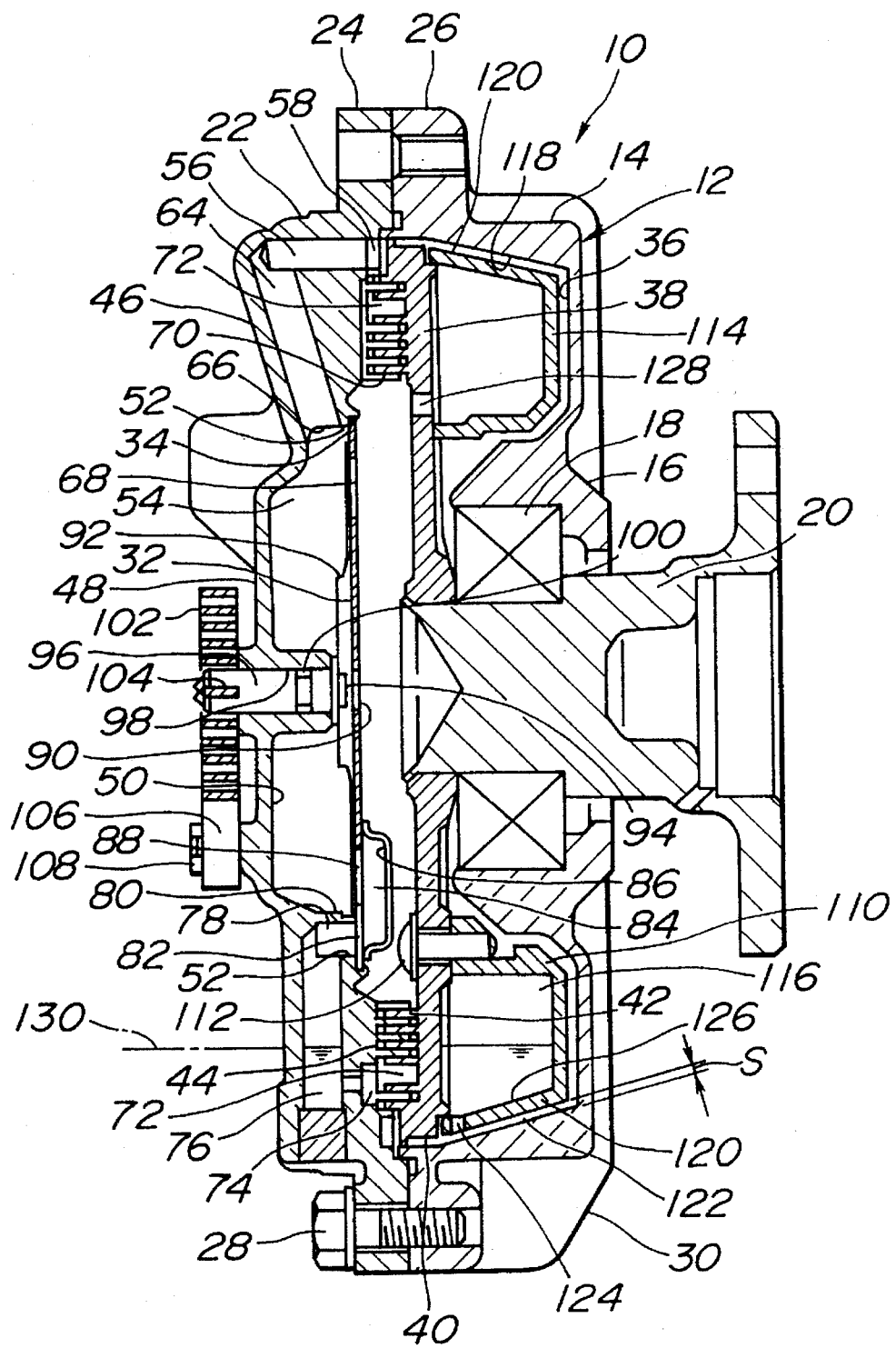
FIG. 1 is a cross-sectional view of a viscous fluid clutch embodying the present invention.

Referring to FIG. 1, a viscous fluid clutch 10, adapted to drive a cooling fan for an internal combustion engine, includes a housing 12 which includes a rear wall 14 having a hub 16 which is rotatably mounted by a suitable bearing 18 on a drive shaft 20. The housing 12 further includes a cover member or front wall 22 which has an annular flat surface 24 formed adjacent its peripheral edge, the latter being confined to an annular flat surface 26 of the rear wall 14 by a plurality of bolts 28. Cooling fins 30 are formed on the outer surface of the rear wall 14. A divider wall 32 is confined in an annular recess 34 formed on the front wall 22 radially inward of the annular flat surface 24. A second annular recess 36 is formed in the rear wall 14 radially outward of the annular recess 34. A clutch plate 38 is secured at its center by any suitable means to the drive shaft 20. The outer peripheral portion of the clutch plate 38 is freely located in an operating chamber 40.

Adjacent portions of the clutch plate 38 and the front wall 22 are provided with torque transmitting elements consisting of cooperating annular ridge and groove elements 42 and 44, respectively, with an intervening fluid shear space therebetween to accommodate a viscous fluid as a torque-transmitting medium. The annular groove elements 44 are formed in the front wall 22 radially inward of the outer edge of the annular recess 36 in the rear wall 14 and outward of the outer edge of the annular recess 34 in the front wall 22.

It may be noted in FIG. 1 that the front wall 22 has an axial protrusion 46 which has an outer periphery intermediate the annular flat surface 24 and the outer edge of the annular recess 36 and an inner periphery radially inward of the annular recess 34. The inner periphery of the axial protrusion 46 merges smoothly into a central portion 48 formed with a circular cavity 50 which has a circular peripheral edge 52 disposed radially inward of the annular recess 34. A reservoir 54 is formed in the circular cavity 52 between the central portion 48 and the divider wall 32. A pump outlet opening 56 is formed in the axial protrusion 46 of the front wall 22 adjacent a pump or dam element 58 formed on the front wall 22. A plurality, three in this embodiment, of pump inlet radial openings 60 are formed in the outer periphery of the clutch plate 38 adjacent the corresponding three of six circumferentially equi-distant pump or dam elements 62 (see FIG. 2) formed in the outer periphery of the clutch plate 38. The pump inlet openings 60 communicate between the shear space and the operating chamber 40 radially outward of the ridge and groove elements 42 and 44. The pump outlet opening 56 communicates between the operating chamber 40 and a return passage 64 formed in the axial protrusion 46 of the front wall 22. The return passage 64 terminates in an opening or return port 66 formed in the cylindrical wall of the circular cavity 50. Thus, the return port 66 communicates with the reservoir 54.

An opening or inlet port 68 is formed in the divider wall 32, communicating between the reservoir 54 and the operating chamber 40 radially inward of the cooperating annular ridge and groove elements 42 and 44. A plurality, four in this embodiment, of radial cutouts 70 are formed on the front wall 22 radially outward of the outer edge of the annular recess 34 and radially inward of the pump or dam element 58. The radial cutouts 70 communicate between the intervening fluid shear space between the ridge and groove elements 42 and 44 and the operating chamber 40 radially inward of the ridge and groove elements 42 and 44. The four radial cutouts 70 are equi-angularly distant and interconnected by an annular wide groove or passage 72 formed on the front wall 22 adjacent and radially inward of the radially outermost groove 44. It may be noted from FIG. 1 that there is no ridge cooperating with this wide annular groove 72. A second opening or inlet port 74 is formed in the front wall 22, communicating between the annular groove 72 and a radial supply passage 76 formed in the front wall 22. This radial passage 76 communicates with a small cavity 78 formed in a protrusion 80 which extends radially into the circular cavity 50 from the circular peripheral edge 52. An opening 82 is formed in the divider wall 32 communicating between the small cavity 78 and a space 84 defined between the divider wall 32 and a cap-like plug 86. The plug 86 is secured at its peripheral edge to the divider wall 32 at a portion radially inward of the ridge and groove elements 42 and 44. An opening or port 88 is formed in the divider wall 32 adjacent and radially inward of the protrusion 80, communicating between the space 84 and the reservoir 54. The divider wall 32 is formed with a center air vent opening 90.

The ports 68 and 88 are closed by a valve member 92. The valve member 92 is secured at a portion intermediate portion 94 of a center pin or shaft 96, which is rotatably mounted in a central opening 98 formed in the front wall 22. A seal ring 100 is mounted in an annular groove formed in the center pin 96 to prevent leakage therepast. A helically wound, bimetallic thermostatic valve control element 102 is provided with an inwardly extending end portion 104 which is mounted in a transverse slot formed in the center pin 96. An outwardly extending end portion 106 of the bimetallic element 102 is secured to a post 108. With this arrangement, a change in an ambient temperature either winds or unwinds the bimetallic element 102, resulting in rotation of the center pin 102 and the valve member 92.

Figure 2:
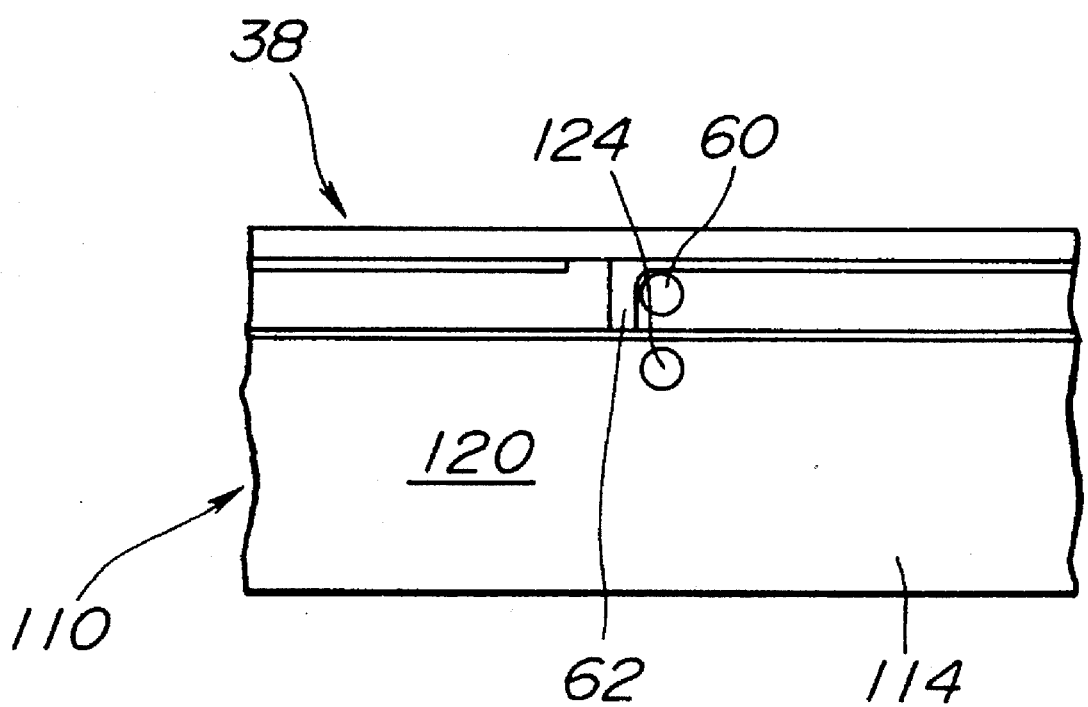
FIG. 2 is a fragmentary side view of a clutch plate with an auxiliary reservoir.

Referring also to FIG. 2, an annular wall 110 is secured, by suitable means such as by a plurality of fastners 112, at its inner and outer peripheral edges to the clutch plate 38 and includes an annular bend 114 between the outer and inner peripheral edges thereof to define an annular auxiliary reservoir 116 in cooperation with the clutch plate 38. The annular bend 114 is freely located in a space formed by the annular recess 36 in the rear wall 14. The annular recess 36 accommodating the annular bend 14 is defined by a conical outer surface 118 increasing its radial distance from the axis of rotation of the drive shaft 20, clutch plate 38 and housing 12. This conical surface 118 and the opposed conical radially outer surface 120 of the annular bend 114 define therebetween an annular conical passage 122 communicating with the operating chamber 40 radially outward of the ridge and groove elements 42 and 44. The annular passage 122 provides a sufficiently wide clearance S between the outer surface 120 of the annular bend 114 and the conical surface 118 of the annular recess 36. The annular bend 114 is formed with a plurality, four in this embodiment, radial openings 124 adjacent the operating chamber 40 radially outward of the ridge and groove elements 42 and 44. With this arrangement, during rotation of the drive shaft 20, the fluid medium thrown outwardly from the auxiliary reservoir 116, owing to the centrifugal force, through the radial openings 124 into the annular passage 122 will flow along the conical surface 118 of the annular recess 36 into the operating chamber 40 radially outward of the ridge and groove elements 42 and 44.

In order to prompt quick discharge of the fluid medium out of the auxiliary reservoir 116 due to the centrifugal force, an inner radially surface 126 of the annular bend 114 is conical and progressively increases its radial distance from the axis of rotation of the drive shaft 20. A vent opening 128 is formed through the clutch plate 38 intermediate the inner edge of the ridge and groove elements 42 and 44 and the inner peripheral edge of the annular wall 110. In other words, the vent hole 128 is disposed radially inward of an imaginary circle, about the axis of rotation of the drive shaft 20, to which a level or line of the fluid medium when the fluid clutch 10 is at rest is tangent. It is to be noted that the annular passage 122 should be large enough in volume so as to prevent the fluid from bridging the surfaces 118 and 120 during rotation of the clutch plate 38 by setting the clearance S to an appropriate value.

So long as the vehicle engine, not shown, is in operation, the drive shaft 20 and the associated clutch plate 38 will be driven at an appropriate speed ratio with respect to engine speed. The initial position of the temperature responsive valve member 92 will be closed across the ports 68 and 88 in the divider wall 32, and will remain closed so long as the engine is cold, thus preventing any flow of fluid from the reservoir 54 into the operating chamber 40. Since the pump outlet opening 56 is always open, providing continuous communication between the operating chamber 40 and the return passage 64, fluid will be pumped therethrough and, then, radially inwardly through the return passage 64 to spill over the return port 66 into the reservoir 54. Owing to the centrifugal force and the conical inner surface 126, fluid is forced out of the auxiliary reservoir 116. The fluid forced out of the radial openings 124 is urged to flow toward the operating chamber 40 radially outward of the ridge and groove elements 42 and 44 to be pumped out of the operating chamber 40 via the pump outlet opening 56. In this process, since fluid flows quickly to the operating chamber 40, no dragging of the housing 12 and thus the associated cooling fan take place.

As the ambient temperature increases due to the warmup of the radiator and engine, the bimetallic thermostatic valve control element 102 will begin to wind up and, since it is restrained at its outer end by the post 108, its inner end 104 will rotate the center pin 96 and the valve member 92, progressively uncovering the ports 88 and 68. As a result, fluid will flow back into the operating chamber 40 in a progressively increasing volume with increasing temperature. As the fluid is admitted to the operating chamber 40, filling the shear space between the cooperating annular ridge and groove elements 42 and 44, the shear-type fluid drive therebetween will be influenced and slip speed, or the difference in speed between that of the clutch plate 38 and the housing 12, will decrease. The pump will continue to promote circulation of fluid from the operating chamber 40 through the pump outlet opening 56 to the return passage 64 and then to the reservoir 54, from whence it will flow through the reservoir 54 and return to the operating chamber 40 via the variably opening ports 88 and 68.

When the cooling requirements are at a maximum, the temperature responsive valve member 92 will have rotated completely away from the ports 88 and 68, causing the relatively rotatable clutch plate 38 and the housing 12 to rotate at minimum slip speed and thereby effecting a maximum cooling function.

Immediately after the engine has ceased its operation, the fluid remaining in the operating chamber 40 starts to flow into the auxiliary reservoir 116 via one or some of the radial openings 124 at a gradual rate, since the radial openings 124 restrict the inflow of fluid into the auxiliary reservoir 116.

What is claimed is:

1. A viscous fluid clutch, comprising:

first and second relatively rotatable drive means, said first drive means having an operating chamber and a reservoir;

fluid shear drive means on said first and second drive means located in said operating chamber operable with a fluid medium to provide a shear-type fluid drive between said first and second drive means;

said first drive means having a pump outlet opening communicating between said operating chamber and said reservoir, said second drive means having wall means defining an auxiliary reservoir, said first drive means and said auxiliary reservoir defining wall means having opposed spaced surfaces defining therebetween a passage communicating with said operating chamber;

radial opening means for providing communication between said auxiliary reservoir and said passage;

said passage defining surface of said first drive means progressively increasing its radial distance from the axis of rotation of said first drive means such that, during rotation of said first drive means, the fluid medium thrown outwardly from said auxiliary reservoir, owing to the centrifugal force, through said radial opening means into said passage will flow along said passage defining surface of said first drive means into said operating chamber; and pump means means for pumping the fluid medium from said operating chamber out of said pump outlet opening.

2. A viscous fluid clutch as claimed in claim 1, wherein said passage defining surface of said auxiliary reservoir defining wall means progressively increases its radial distance from the axis of rotation of said first drive means.

3. A viscous fluid clutch as claimed in claim 1, wherein said auxiliary reservoir defining wall means has an inner surface progressively increasing its radial distance from the axis of rotation of said first drive means such that, during rotation of said first drive means, the fluid medium is thrown outwardly, owing to the centrifugal force, will flow along said inner surface of said auxiliary reservoir defining wall means toward said radial opening means.

4. A viscous fluid clutch as claimed in claim 3, wherein said radial opening means is formed through said auxiliary reservoir defining wall means at a portion adjacent said operating chamber.

5. A viscous fluid clutch as claimed in claim 4, wherein said radial opening means is in the form of an orifice.

6. A viscous fluid clutch as claimed in claim 1, wherein said passage is annular.

7. A viscous fluid clutch, comprising:

a drive shaft;

a housing rotatably mounted to said drive shaft, said housing including a reservoir, an operating chamber and a pump outlet opening communicating between said operating chamber and said reservoir;

a clutch plate attached to said drive shaft and disposed in said operating chamber;

fluid shear drive means on said housing and said clutch plate located in said operating chamber operable with a fluid medium to provide a shear-type fluid drive between said housing and said clutch plate;

an annular wall secured at inner and outer peripheral edges thereof to said clutch plate and including an annular bend between said outer and inner peripheral edges thereof to define an annular auxiliary reservoir in cooperation with said clutch plate;

said housing having an annular recess accommodating said annular bend and including a conical surface defining an outer portion of said annular recess, said conical surface increasing its radial distance from the axis of rotation of said clutch plate, said conical surface and the opposed surface of said annular bend defining therebetween an annular passage communicating with said operating chamber;

radial opening means formed in said annular bend adjacent said operating chamber, the arrangement being such that, during rotation of said drive shaft and said clutch disc, the fluid medium thrown outwardly from the auxiliary reservoir, owing to the centrifugal force, through said radial opening means into said annular passage will flow along said conical surface into said operating chamber.

* * * * *

UNITED STATES PATENT AND TRADEMARK OFFICE
CERTIFICATE OF CORRECTION

PATENT NO. : 5,499,706
DATED : March 19, 1996
INVENTOR(S) : Shinichi Kawada

It is certified that error appears in the above-indentified patent and that said Letters Patent is hereby corrected as shown below:

Title page, item [30], Foreign Application Priority Data, December 30, 1993 [JP] Japan......5-76102 (U) --.

Signed and Sealed this

Twenty-fourth Day of September, 1996

Attest:

BRUCE LEHMAN

Attesting Officer

Commissioner of Patents and Trademarks